United States Patent
Lai et al.

(10) Patent No.: US 8,300,900 B2
(45) Date of Patent: Oct. 30, 2012

(54) FACE RECOGNITION BY FUSING SIMILARITY PROBABILITY

(75) Inventors: Shang-Hong Lai, Hsinchu (TW); Chia-Te Liao, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 969 days.

(21) Appl. No.: 12/349,260

(22) Filed: Jan. 6, 2009

(65) Prior Publication Data

US 2010/0135541 A1 Jun. 3, 2010

(30) Foreign Application Priority Data

Dec. 2, 2008 (TW) .............................. 97146813 A

(51) Int. Cl.
G06K 9/00 (2006.01)
G06K 9/62 (2006.01)
G06T 15/00 (2011.01)
(52) U.S. Cl. ......... 382/118; 382/154; 382/228; 345/419
(58) Field of Classification Search .................. 382/118, 382/154, 228; 345/419
See application file for complete search history.

(56) References Cited

U.S. PATENT DOCUMENTS

| | | | | |
|---|---|---|---|---|
| 6,556,196 B1 * | 4/2003 | Blanz et al. | ..................... | 345/419 |
| 7,499,574 B1 * | 3/2009 | Yang et al. | ..................... | 382/118 |
| 7,536,030 B2 * | 5/2009 | Wang et al. | ..................... | 382/103 |
| 7,596,247 B2 * | 9/2009 | Ioffe | .............................. | 382/118 |
| 7,664,962 B2 * | 2/2010 | Kuhlman | ....................... | 713/186 |
| 7,728,839 B2 * | 6/2010 | Yang et al. | ..................... | 345/474 |
| 7,783,082 B2 * | 8/2010 | Koshizen et al. | ............. | 382/118 |
| 8,050,465 B2 * | 11/2011 | Ianculescu et al. | ........... | 382/118 |
| 2002/0106114 A1 * | 8/2002 | Yan et al. | ....................... | 382/118 |
| 2003/0149803 A1 * | 8/2003 | Wilson | .............................. | 710/1 |
| 2007/0031028 A1 * | 2/2007 | Vetter et al. | .................... | 382/154 |
| 2007/0122001 A1 * | 5/2007 | Wang et al. | ................... | 382/103 |
| 2010/0134487 A1 * | 6/2010 | Lai et al. | ........................ | 345/419 |

OTHER PUBLICATIONS

"Video-Based Face Recognition Based on View Synthesis From 3D Face Model Reconstructed From a Single Image," Chia-Te Liao, et al. 2008 IEEE International Conference on Multimedia and Expo, Jun. 23 2008-Apr. 26, 2008, pp. 1589-1592.*

"Face Identification by Fitting a 3D Morphable Model using Linear Shape and Texture Error Functions," Sami Romdhani, et al, the European Conference on Computer Vision, 2002, pp. 1-15.*

(Continued)

Primary Examiner — Wenpeng Chen
(74) Attorney, Agent, or Firm — Muncy, Geissler, Olds & Lowe, PLLC

(57) ABSTRACT

The invention discloses a face recognition method that reconstructs a 3D face model from a single face image, synthesizes a set of face images under different conditions (such as pose, light . . . ) via the 3D face model, feeds the set of face images under different conditions to the face recognition classifier for training, and making intermediate decisions whether to-be identified individual from a series of video frames is a legal system user by the face recognition classifier. Moreover, the method not only recognizes legal system users, but also rejects imposters, a function inspired by the idea of LLE. Finally, better reliability can be achieved by fusing temporal intermediate decisions.

12 Claims, 4 Drawing Sheets

OTHER PUBLICATIONS

"Face Recognition with Weighted Locally Linear Embedding," Nathan Mekuz, et al. Proceedings of the Second Canadian Conference on Computer and Robot Vision (CRV'05), 7 pages.*

"Separating Style and Content on a Nonlinear Manifold," Ahmed Elgammal, et al., Proceedings of the 2004 IEEE Computer Society Conference on Computer Vision and Pattern Recognition (CVPR'04), 8 pages.*

"Fitting a Morphable Model to 3D Scans of Faces," Volker Blanz, et al., Proc. Of Int. Conf. on Computer Vision ICCV 2007, 8 pages.*

* cited by examiner

FACE RECOGNITION BY FUSING SIMILARITY PROBABILITY

BACKGROUND OF THE INVENTION

1. Field of the Invention

The present invention relates to a face recognition method, particularly reconstructing a 3D morphable face model from a single face image, and recognizing a series of face video frames from a video receiving apparatus by fusing similarity probability of each video frame.

2. Description of the Related Art

Face recognition is one of the most important research areas in computer vision and biometric recognition. For 2D face recognition, the main challenge is the variations of face images for the same individual under different capturing conditions such as angles, light source, etc. To overcome the problem, most developed algorithms rely on a large number of training examples under different conditions for each individual. However, it is difficult to collect 2D face images under a precise condition with the variation in real-world applications.

Recently, 3D face modeling from images is very popular for many applications, such as facial animation and face recognition. Model-based statistical techniques have been widely used for robust face modeling. Most of the previous 3D face reconstruction techniques require more than one 2D face image to achieve satisfactory 3D face modeling. Although another approach for 3D face reconstruction requires only a single image, the problem is restricted by requiring a statistical head model known as a priori. Besides, most of the previous face recognition method cannot differentiate imposters who have not been present before. For the increasingly popular face recognition system, simplifying sampling complexity and training difficulties, and increasing recognition accuracy are problems need to be solved.

SUMMARY OF THE INVENTION

To solve aforementioned problem, one objective of the present invention is to propose a face recognition method, which constructs a 3D face model using a single 2D face image, and simulate face image variations under different conditions. The synthesized face images are used to train a face recognition classifier. Besides, the present invention employs a locally linear embedding concept, which not only can recognize face images of legal system users, but also can reject imposters. Furthermore, the present invention temporally integrates single-frame decisions by a probabilistic approach to increase the reliability of face recognition.

To achieve aforementioned objective, one embodiment of the present invention proposes a face recognition method including obtaining an original face image from a database, reconstructing a 3D face model for the original face image using a 3D morphable face model, providing synthesized face images from the 3D face model for training a face recognition classifier, receiving a plurality of video frames of a face, obtaining a similarity probability for each video frame from the face recognition classifier, and fusing the temporal similarity probability for each video frame by accumulation to obtain a face recognition confidence value, and if the face recognition confidence value is larger than a threshold, the face is recognized to be the same as the face in the original face image.

DETAILED DESCRIPTION OF THE INVENTION

The face recognition method of the present invention reconstructs a 3D face model from a single 2D face image using a 3D morphable model, and synthesizes a large set of 2D face images under different head poses for training the face recognition model. Also, this method temporally integrates single-frame recognition decisions via a probabilistic approach to increase recognition accuracy, and rejects non-system allowed imposters based on a LLE (locally linear embedding) method.

Figure 1:
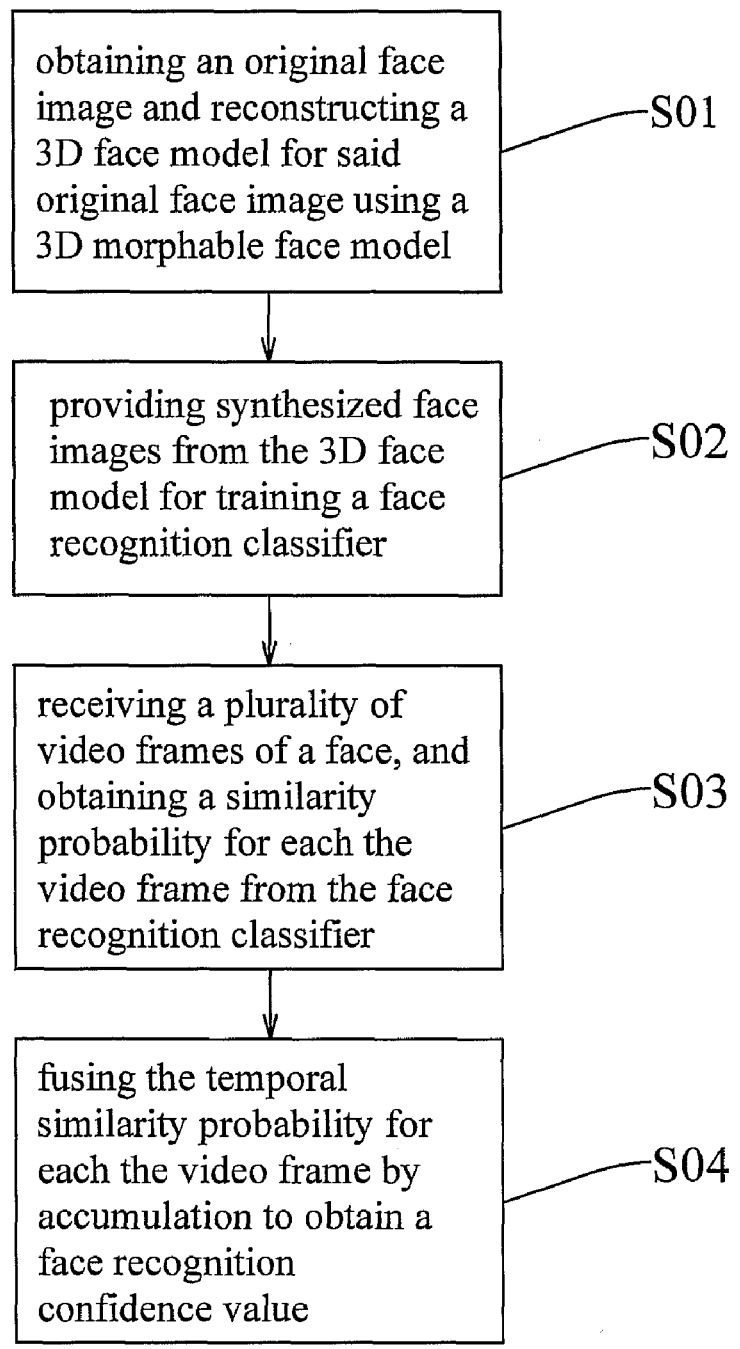
FIG. 1 is a flowchart of the face recognition method of one embodiment of the present invention.

The flowchart of one embodiment of the present invention is shown in FIG. 1. This embodiment uses face recognition as an example, but the method can also be applied to recognizing diagrams or other images. In step S01 of this embodiment, an original face image is obtained from a database, and a 3D face model is reconstructed from the original face image using a 3D morphable face model. The 3D morphable face model provides prior knowledge of geometry and texture information of a normal face. A 3D morphable face model can be represented by a 3D geometry data set, $S=(x_1, y_1, z_1, x_2, y_2, z_2, \ldots, x_N, y_N, z_N) \in \Re^{3N}$, and 3D texture data set, $T=(r_1, g_1, b_1, r_2, g_2, b_2, \ldots, r_N, g_N, b_N) \in \Re^{3N}$, where N is the number of sampling points for the curved surface of a 3D face. Then the 3D geometry data set and 3D texture data set of the 3D face is approximated by a linear combination of a plurality of eigen-head basis vectors, shown as follows:

$$S(\alpha) = \overline{S} + \sum_{i=1}^{m} \alpha_i s_i \quad (1)$$

$$T(\beta) = \overline{T} + \sum_{i=1}^{m} \beta_i t_i \quad (2)$$

wherein $\overline{S}$ is the mean shape vector, $\overline{T}$ is the mean texture vector, $s_i$ is the $i_{th}$ eigen-shape basis vector, $t_i$ is the $i_{th}$ eigen-texture basis vector, $\alpha=[\alpha_1, \ldots, \alpha_m]$ and $\beta=[\beta_1, \ldots, \beta_m]$ are the shape and texture coefficients, respectively, to represent the 3D face.

Figures 2A, 2B, 2C, 2D:
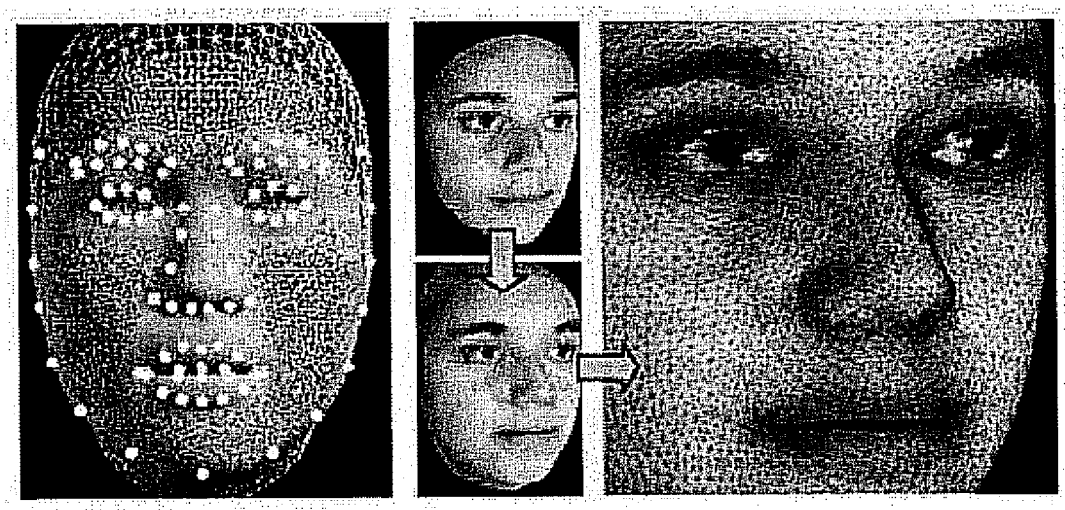
FIG. 2a-FIG. 2d are diagrams showing the 3D morphable model reconstructed from an original face image according to one embodiment of the present invention.

The embodiment uses 3D scans and image database of BU-3DFE (3D facial expression database) as the data source for producing eigen head basis vectors. Please referring to FIG. 2a to FIG. 2d, they are conceptual diagrams of a 3D morphable face model in one embodiment of the present invention. FIG. 2a shows the generic face model labeled with a plurality of feature points; FIG. 2b is the original face image from a database; FIG. 2c shows the reconstructed 3D face model of FIG. 2b after registration, re-sampling and smoothing; and FIG. 2d shows the triangulation detail of FIG. 2c.

The abovementioned 3D face reconstruction is initialized by the feature points in FIG. 2a, and then a shape data set, $\alpha$, a texture data set, $\beta$, and a plurality of 3D characteristic parameters are obtained respectively by photometric error minimization to achieve a 3D morphable face model best represent the input face. The 3D characteristic parameters are found from minimizing a cost function of the following form:

$$\|I_{input} - I_{model}(\alpha, \beta, P_{ortho}, f, R, t_{2d})\| \quad (3)$$

wherein $I_{input}$ is the original face image, $P_{ortho}$ is an orthographic projection matrix, f is the scaling factor, R is the 3D rotation matrix, and $t_{2d}$ is the translation vector. The minimization of function (3) can be solved by using the Levenberg-Marquart (LM) optimization.

Figure 3:
FIG. 3 shows the synthesized images according to one embodiment of the present invention.

In step S02, possible variations of the image are simulated by the reconstructed 3D face model, and used to train a face recognition classifier for the original face image. FIG. 3 shows the 2D face images synthesized with pre-defined characteristic parameters, based on the original 2D face image, by using the reconstructed 3D face model. The image in the middle is the original face image, and others are the synthesized face images under different poses.

In step S03, a plurality of video frames of a face are received, and a similarity probability is obtained for each video frame from the face recognition classifier. In step S04 the probability of each video frame is fused temporally to obtain a confidence value. If the confidence value is greater than a threshold, the received face video frames are recognized to have the same identity as the individual in the original face image. The method for fusing previous recognition results is shown in expression (4):

$$P_i^t = \frac{(\omega \times P_i^{t-1} + (1-\omega) \times P_i^{t,SVC})}{\sum_i (\omega \times P_i^{t-1} + (1-\omega) \times P_i^{t,SVC})}, i = 1, 2, \ldots, n \quad (4)$$

wherein $\omega$ is a forgetting factor, $P_i^{t,SVC}$ is a posterior probability denoting the probability that this user belongs to class i decided by a single video frame at time t. In one embodiment, we merge $P_i^{t,SVC}$ with the previously accumulated probability $P_i^{t-1}$ and obtain a final similarity probability $P_i^t$ accumulated up to time t.

Figure 4:
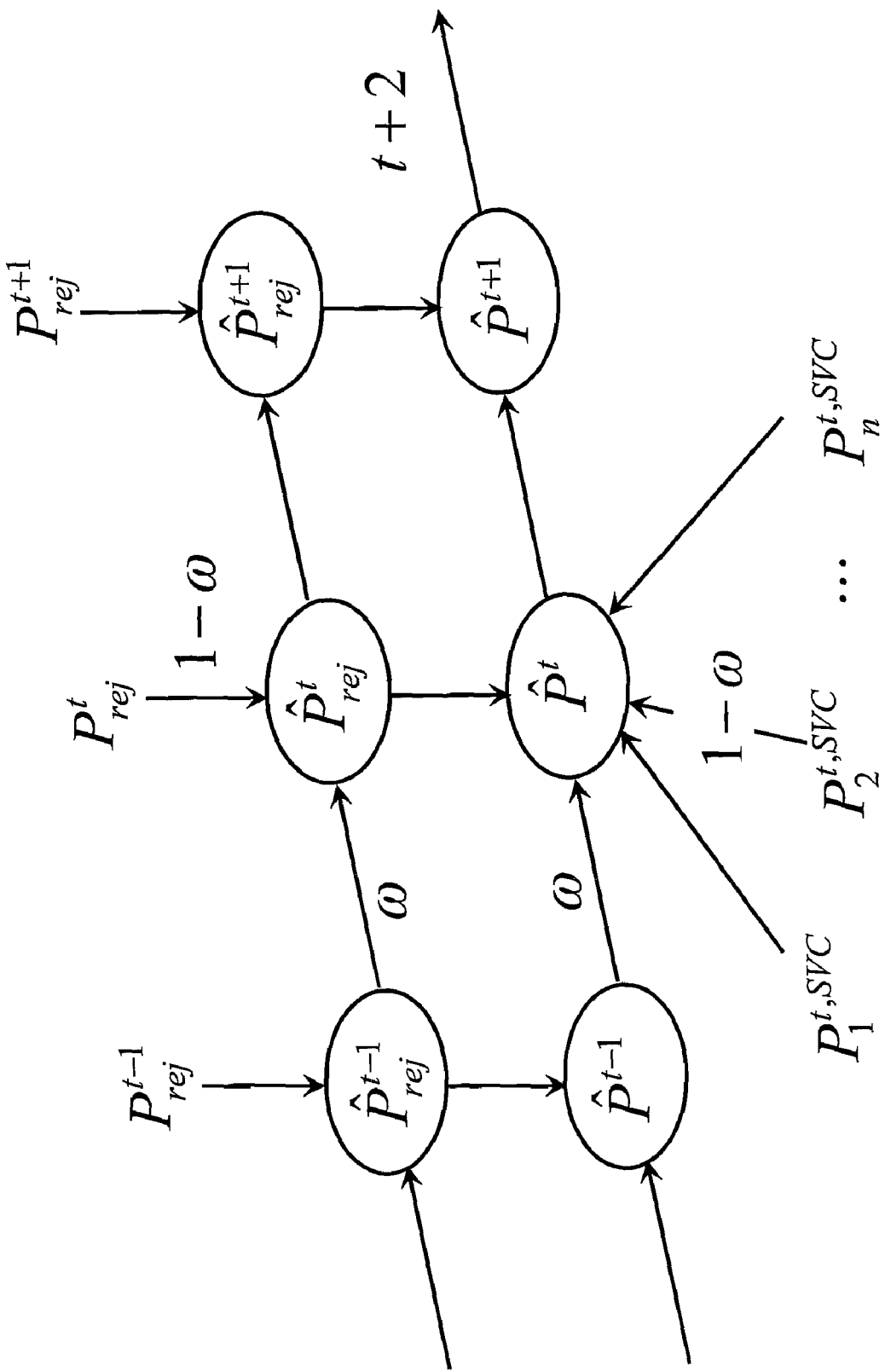
FIG. 4 is a diagram showing the conceptual framework of fusing temporal information for face recognition of one embodiment of the present invention.

On the other hand, when it comes to an applicable face recognition system, it must have the ability to reject imposters who have not been present before and only accept legal system users. Borrowing the idea from LLE that nonlinear data is locally linear on a manifold, if a to-be recognized image cannot be well-reconstructed linearly via the training images of the same person, the image is likely to be from an imposter. Therefore, a recognized face $I^t$ at frame t is supposed to be reconstructed well by its K nearest neighbors in the predicted class c. The similarity error $\epsilon^t$ of an input face $I^t$ is defined to be:

$$\varepsilon^t(w) = \left\| I^t - \sum_{j=1}^{K} w_j^{c,t} I_j^c \right\| \quad (5)$$

wherein $w_j^{c,t}$ denotes the weights of K nearest neighbors in class c that best approximate said video frame $I^t$, and $$\sum_{j=1}^{K} w_j^{c,t} = 1; \{I_j^c\}_{j=1}^{K}$$

is the set of K nearest neighbors of the same class. Then a sigmoid function is applied to transform $\epsilon^t$ to the corresponding rejection probability $P_{rej}^t$ with a recursive definition:

$$P_{rej}^t = 1 - \exp\left(\frac{-\varepsilon^t}{\varepsilon_{threshold}^c}\right), \hat{P}_{rej}^t = \omega \times \hat{P}_{rej}^{t-1} + (1-\omega) \times P_{rej}^t \quad (6)$$

wherein $\epsilon_{threshold}^c$ is the parameter controlling the rejection rate. It turns out that face $I^t$ cannot belong to a system user if it has a large rejection probability $\hat{P}_{rej}^t$. Please referring to FIG. 4, it is a diagram showing the conceptual framework of fusing temporal information for face recognition. Finally, the similarity probability $P_i^t$ is summed up with the rejection probability $\hat{P}_{rej}^t$, and normalized to obtain the posterior probability $\hat{P}_i^t$ of the video frame belonging to class c up to time t, which can be expressed by expression (7):

$$\hat{P}_i^t = \frac{\beta^t \times (\omega \times P_i^{t-1} + (1-\omega) \times P_i^{t,SVC})}{(\omega \times \hat{P}_{rej}^{t-1} + (1-\omega) \times P_{rej}^t) + \beta^t \times \sum_i (\omega \times P_i^{t-1} + (1-\omega) \times P_i^{t,SVC})}, \quad (7)$$

wherein i=1, 2, ..., n, and $\beta^t = 1 - \hat{P}_{rej}^t$ is the acceptance rate at time t, and $\hat{P}^t = [\hat{P}_1^t, \hat{P}_2^t, \ldots, \hat{P}_{rej}^t]^T$ is the posterior probability distribution. If $\hat{P}_i^t$ exceeds a threshold $P_{th}$, the present invention can decide the identity of the face in video frames. If $$\arg\max_i \hat{P}_i^t = n + 1$$

(class n+1 for the imposter class), then the to-be recognized face is rejected; otherwise, the face is determined to be of a legal system user and his/her identity is further recognized, i.e.

$$c = \arg\max_i \hat{P}_i^t, c = 1, 2, \ldots, n.$$

In conclusion, the present invention reconstructs a face model via a 3D morphable model, and synthesizes variations of a face image as the training database for face recognition classifier. In the process of constructing 3D face model and training face recognition classifier, only a 2D image is needed for the user of each class. This improves from the statistical approach which requires collecting a large amount of face training samples.

The embodiments described above are to demonstrate the technical contents and characteristics of the preset invention to enable the persons skilled in the art to understand, make, and use the present invention. However, it is not intended to limit the scope of the present invention. Therefore, any equivalent modification or variation according to the spirit of the present invention is to be also included within the scope of the present invention.

What is claimed is:

1. A face recognition method comprising:
   obtaining an original face image from a database and reconstructing a 3D face model for said original face image using a 3D morphable face model;
   providing synthesized face images from said 3D face model for training a face recognition classifier;
   receiving a plurality of video frames of a face, and obtaining a similarity probability for each said video frame from said face recognition classifier; and
   fusing said similarity probability for each said video frame by accumulation to obtain a face recognition confidence value, and if said face recognition confidence value is larger than a threshold, said face is recognized to be the same as the face from said original face image.

2. The face recognition method according to claim 1, wherein said original face image is a 2D image.

3. The face recognition method according to claim 1, wherein steps for reconstructing said 3D face model for said original face image include:

constructing said 3D morphable face model, wherein said 3D morphable face model comprises a 3D geometry data set and a 3D texture data set;

expressing said 3D morphable face model by a linear combination of a plurality of eigen head basis vectors; and obtaining a geometry data set, a texture data set and 3D characteristic parameters by photometric error minimization for reconstructing said 3D face model corresponding to said original face image.

4. The face recognition method according to claim 3, wherein said 3D geometry data set can be expressed as: $S=(x_1, y_1, z_1, x_2, y_2, z_2, \ldots, x_N, y_N, z_N) \in \Re^{3N}$, wherein N is the number of facial sampling points.

5. The face recognition method according to claim 3, wherein said 3D texture data can be expressed as:

$T=(r_1, g_1, b_1, r_2, g_2, b_2, \ldots, r_N, g_N, b_N) \in \Re^{3N}$, wherein N is the number of facial sampling points.

6. The face recognition method according to claim 3, wherein said geometry data set is:

$$S(\alpha) = \bar{S} + \sum_{i=1}^{m} \alpha_i s_i; \text{ and}$$

said texture data set is:

$$T(\beta) = \bar{T} + \sum_{i=1}^{m} \beta_i t_i,$$

wherein $\bar{S}$ is the mean shape vector, $\bar{T}$ is the mean texture vector, $s_i$ is the $i_{th}$ eigen-shape basis vector, $t_i$ is the $i_{th}$ eigen-texture basis vector, $\alpha=[\alpha_1, \ldots, \alpha_m]$ are the corresponding coefficients of said eigen-shape basis vectors and $\beta=[\beta_1, \ldots, \beta_m]$ are the corresponding coefficients of said eigen-texture basis vectors.

7. The face recognition method according to claim 3, wherein said 3D characteristic parameters are produced by minimizing a cost function: $\|I_{input} - I_{model}(\alpha, \beta, P_{ortho}, f, R, t_{2d})\|$, wherein $I_{input}$ is said input original face image, $P_{ortho}$ is an orthographic projection matrix, f is the scaling factor, R is the 3D rotation matrix, and $t_{2d}$ is the translation vector.

8. The face recognition method according to claim 1, wherein the step for obtaining said face recognition confidence value by fusing said temporal similarity probability of each said video frame by accumulation is:

$$P_i^t = \frac{(\omega \times P_i^{t-1} + (1-\omega) \times P_i^{t,SVC})}{\sum_i (\omega \times P_i^{t-1} + (1-\omega) \times P_i^{t,SVC})}, i=1, 2, \ldots, n,$$

wherein $\omega$ is a forgetting factor, $P_i^{t,SVC}$ is a posterior probability, denoting the probability that a single video frame belongs to the $i_{th}$ class at time t, and $P_i^{t,SVC}$ is merged with previously accumulated probability $P_i^{t-1}$ to contribute to the final similarity probability $P_i^t$ accumulated up to time t.

9. The face recognition method according to claim 1, including:

calculating a rejection probability $P_{rej}^t$ for each said video frame; and summing up said similarity probability $P_i^t$ along with said rejection probability $\hat{P}_{rej}^t$ up to time t for normalization and obtaining a posterior probability $\hat{P}_i^t$ of said video frames up to time t belonging to class c.

10. The face recognition method according to claim 9, wherein steps for calculating said rejection probability of each said video frame comprises:

$$\varepsilon^t(w) = \left\| I^t - \sum_{j=1}^{K} w_j^{c,t} I_j^c \right\|; \text{ and}$$

$$P_{rej}^t = 1 - \exp\left(\frac{-\varepsilon^t}{\varepsilon_{threshold}^c}\right),$$

$$\hat{P}_{rej}^t = \omega \times \hat{P}_{rej}^{t-1} + (1-\omega) \times P_{rej}^t,$$

wherein $w_j^{c,t}$ denotes the weights of K nearest neighbors in class c that best approximate said video frame $I^t$, and $$\sum_{j=1}^{K} w_j^{c,t} = 1; \{I_j^c\}_{j=1}^{K}$$

is the set of K nearest neighbors of the same class; and $\epsilon_{threshold}^c$ threshold is the parameter for controlling rejection rate.

11. The face recognition method according to claim 9, wherein the step for summing up said similarity probability along with said rejection probability up to time t for normalization can be expressed as:

$$\hat{P}_i^t = \frac{\beta^t \times (\omega \times P_i^{t-1} + (1-\omega) \times P_i^{t,SVC})}{(\omega \times \hat{P}_{rej}^{t-1} + (1-\omega) \times P_{rej}^t) + \beta^t \times \sum_i (\omega \times P_i^{t-1} + (1-\omega) \times P_i^{t,SVC})},$$

wherein $i=1, 2, \ldots, n$, $\beta^t = 1 - \hat{P}_{rej}^t$ is the acceptance rate at time t, and $\hat{P}^t = [\hat{P}_1^t, \hat{P}_2^t, \ldots, \hat{P}_{rej}^t]^T$ is the posterior probability distribution.

12. The face recognition method according to claim 9, wherein if $\hat{P}_i^t$ is greater than said threshold and $$\arg\max_i \hat{P}_i^t = n+1,$$

then said face image is determined to be belonging to an imposter; otherwise, said face image is recognized as a legal system user and his/her identity is further recognized, i.e.

$$c = \arg\max_i \hat{P}_i^t,$$

and $c=1, 2, \ldots, n$.

* * * * *